United States Patent [19]
Jones

[11] 3,854,329
[45] Dec. 17, 1974

[54] APPARATUS FOR WEB TENSION MEASUREMENT

[75] Inventor: Graham Robin Scott Jones, Bristol, England

[73] Assignee: Masson Scott Trissell Engineering Ltd., Bristol, England

[22] Filed: Nov. 21, 1972

[21] Appl. No.: 308,424

[30] Foreign Application Priority Data
Nov. 23, 1971 Great Britain.................... 54242/71

[52] U.S. Cl. ................................................ 73/143
[51] Int. Cl. .............................................. G01l 5/10
[58] Field of Search.......... 73/DIG. 1, 143, 517 AV, 73/144, 95.5

[56] References Cited
UNITED STATES PATENTS
1,948,104  2/1934   Firestone et al. .............. 73/517 AV
3,394,587  7/1968   Freeman ............................. 73/143

Primary Examiner—Jerry W. Myracle
Attorney, Agent, or Firm—Craig & Antonelli

[57] ABSTRACT

Tension in a web of paper is measured by exciting transverse vibrations in the web, by means of a moving coil loudspeaker, sensing the vibrations by means of a microphone, and applying part of the output of an amplifier, connected between the microphone and the loudspeaker, via a frequency-to-voltage converter, to a meter which is adapted to give a reading indicative of the web tension. The apparatus may be used as a portable device or fitted to a machine to control the braking torque applied to a reel of paper by comparing the signal from the converter with a reference signal, and using the resultant signal to control the applied braking torque.

6 Claims, 4 Drawing Figures

APPARATUS FOR WEB TENSION MEASUREMENT

This invention relates to methods and apparatus for measuring tension in a web of material such as paper and more particularly to such methods and apparatus in which use is made of the fact that the behaviour of transverse vibrations in the web is a function of the web tension.

It is known that any given length of web, in tension between supports, has a natural frequency of transverse vibration (i.e., vibration normal to the plane of the web). Also, the velocity of propagation of transverse vibrations along the web is also dependent upon the tension. The approximate relationships (for small vibration amplitude) for a stretched string may also be applied to a stationary web and are:

$$f = [1/(2l)] \sqrt{T/m} \text{ and } V = \sqrt{T/m}$$

where
- $f$ = natural frequency (fundamental)
- $l$ = length between supports
- $T$ = tension
- $m$ = mass per unit length
- $V$ = velocity of propagation The relationships defined by the above equations may be corrected without difficulty to allow for motion of the web.

It is an object of the invention to provide a method and apparatus for measuring web tension, utilising the behaviour of the web under transverse vibration as an indication of the tension to be measured.

According to the invention therefore there is provided apparatus for measuring web tension including means for exciting transverse vibrations in said web and means for producing an indication of web tension in response to measurement of said vibrations.

The sensing is of the velocity of propagation of such vibration, the exciting means subjecting the web to an impulsive disturbance, and thereafter the passage of the disturbance along the web is sensed by means of the two separate sensors at different fixed distances from the point at which the disturbance is created. The time interval between the sensing of the disturbance at the nearer and farther sensors is readily converted to an indication of propagation velocity and hence of tension.

It will be appreciated that where references are made herein to loudspeakers or microphones, these terms comprehend any form of transducer respectively capable of producing or sensing transverse vibrations in the web. For example, a photo-electric device may be so arranged that change of position of the web during each cycle of vibration varies its illumination, hence its electrical output will reproduce the web vibrations, and such a device can serve as a "microphone" for the purposes of the present invention. Such a photo-electric device may be used with advantage as a sensor when a conventional moving-coil loudspeaker is employed to excite vibrations in the web, as it will be apparent that the photo-electric device will not be directly influenced by sound emitted by the loudspeaker, i.e., by air-pressure variations, or other background noise.

Tension measuring apparatus embodying the invention may readily be applied to automatic control of tension in web-fed machines, e.g. paper-converting machines and printing presses.

In order that the invention may be well understood, two preferred embodiments thereof will now be described with reference to the accompanying diagrammatic drawings, in which.

Figure 1:
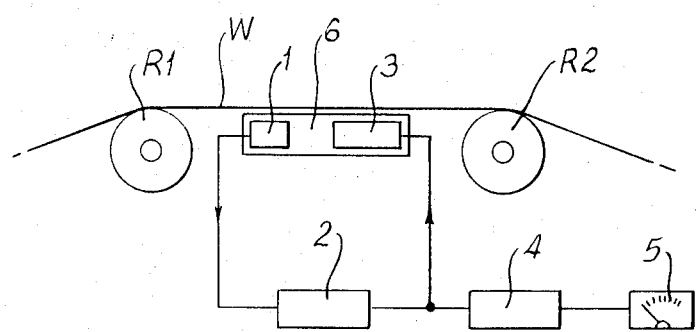
FIG. 1 is a schematic diagram of a web tension indicator embodying the invention which could be made as a portable device.

The indicator of FIG. 1 comprises a microphone 1 connected to the input of an amplifier 2, a loudspeaker 3 connected to the output of said amplifier, a frequency-to-voltage converter 4 having its input also connected to the output of the amplifier 2, and a voltmeter 5 connected to the output of said converter. The voltmeter may be calibrated in terms of web tension.

The microphone 1 and loudspeaker 3 are mounted on a common support indicated at 6 and in use the indicator is so placed that said microphone 1 and loudspeaker 3 are close to the path of a web W (e.g., of paper being fed to a paper-converting machine) stretched between two guide rollers R1, R2. The length of web facing the microphone and loudspeaker then serves to complete an oscillatory loop, as any vibration of the web is sensed by the microphone 1, amplified by amplifier 2, and serves through loudspeaker 3 to excite further vibration of the web. The loop therefore oscillates at the natural frequency of the length of web stretched between the rollers R1, R2. The converter 4 receives part of the amplifier output and converts it to a corresponding voltage (i.e., a voltage representing the frequency of the signal received from the amplifier) and said corresponding voltage operates the voltmeter 5 to give a reading on the latter directly indicating the web tension. (Direct calibration of the meter 5 in terms of tension is of course only possible if all other relevant factors are constant).

It is preferred that the microphone 1 should be a photo-electric device, in view especially of the fact that (as mentioned above) such a device will not respond directly to sound from the loudspeaker 3.

Figure 2:
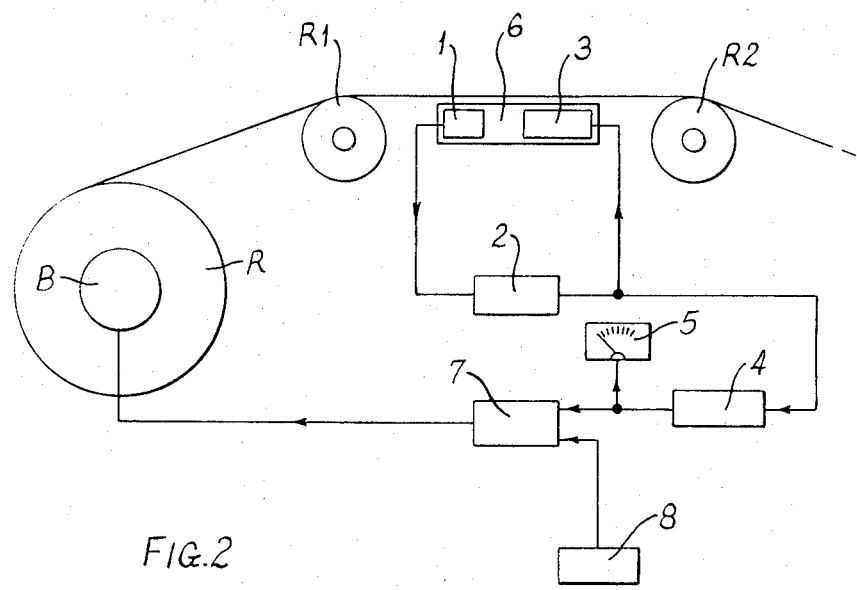
FIG. 2 is a similar diagram of a tension control system including tension measuring apparatus similar to that of FIG. 1.

The system of FIG. 2 includes all the elements shown in FIG. 1 and described above, but the output of the converter 4 is also fed to one input of a comparator and servo-amplifier unit 7. A second input of unit 7 receives a reference input voltage from control source 8. Within the unit 7 the voltages at its two inputs are compared by subtraction and the difference amplified to provide a control signal to a brake unit B operating on a supply reel R from which the paper web W running over guide rollers R1, R2 is drawn. Thus the braking torque exerted on reel R controls the tension in the web W between guide rollers R1, R2 (the roller R1 at least being an idler roller).

Whenever the voltage output from the converter 4 indicates a frequency (and hence a web tension) higher than that corresponding to the reference input voltage from source 8, the amplified difference output from unit 7 is of such polarity as to reduce the braking torque exerted by unit B. This reduces the tension in web W, hence the natural frequency of the length of web between the rollers R1, R2 is reduced. If however the output from converter 4 indicates a frequency (and tension) lower than that corresponding to the reference voltage input, the brake unit B is caused to increase the web tension. In either case, the setting of brake unit B is varied in an appropriate sense until the two inputs to the unit 7 are equal, whereupon the system is in equilibrium at a web tension of a desired value corresponding to the value of the reference input voltage. Any desired change of web tension can be effected by changing the reference input voltage supplied by the source 8, whereupon the two inputs to the unit 7 will no longer be equal and the setting of the brake unit B will be changed (in response to the amplified difference output from unit 7) until the new desired value of web tension is obtained.

Figure 3:
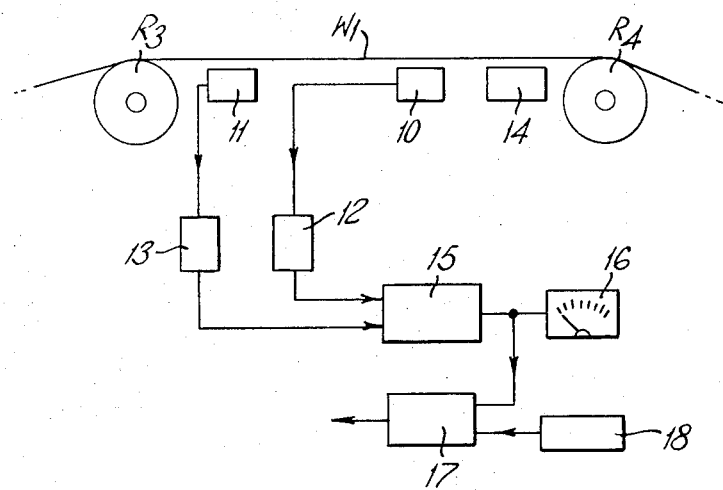
FIG. 3 is a schematic diagram of a modified form of web tension indicator.

A preferred form of tension measuring apparatus is shown in FIG. 3 and comprises two microphones 10, 11 connected respectively to the inputs of two amplifiers 12, 13 and a loudspeaker 14, which in this case is fed with electric pulses by any convenient means (not shown).

The microphones 10, 11 and loudspeaker 14 are positioned close to the path of a travelling web W1 (running from right to left as seen in FIG. 3) stretched between two guide rollers R3, R4, the microphones 10, 11 being spaced apart along the length of the web W1 at different distances from the loudspeaker 14 in a downstream direction from the latter.

Each pulse reaching the loudspeaker 14 causes an air pressure change by which the web W1 is subjected to an impulsive disturbance, and the microphones 10, 11 will each sense the disturbance thus created, but at different instants in time due to their separation. The resulting signals from the microphones 10, 11 are amplified by amplifiers 12, 13 respectively and then fed to a device 15 which is of the nature of a digital-to-analogue converter, being adapted to convert the time interval between the sensing of the disturbance in the web W1 by the microphones 10, 11 into a voltage which is indicative of the time interval and hence of the propagation velocity of the disturbance in the web, which in turn is indicative of the web tension. This voltage is applied to a voltmeter 16 which thus gives a direct reading of web tension.

The arrangement so far described with reference to FIG. 3 is also suitable for incorporation in a system for controlling the tension in a web, such as that shown in FIG. 2. To obtain this result, the elements numbered 10–16 of FIG. 3 replace the elements numbered 1–5 of FIG. 2. Additionally the output of device 15 is also fed to one input of a comparator and servo-amplifier unit 17. A second input of unit 17 receives a reference input voltage from a control source 18. The unit 17 and control source 18 are identical respectively to the unit 7 and control source 8 of FIG. 2, and the output voltage from the device 15 may be used to control the braking torque applied to a reel of paper, as described above with reference to FIG. 2.

It should be noted that the web could be subjected to an impulsive disturbance by means other than the loudspeaker 14, e.g., mechanically or electrostatically.

Figure 4:
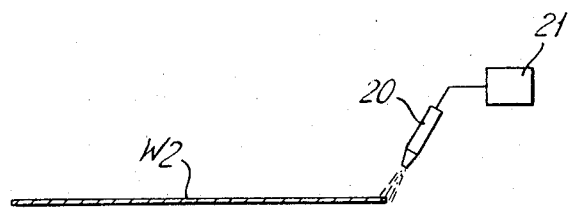
FIG. 4 is a diagrammatic showing of a modified form of web exciting device.

A further means of exciting vibration in the web is shown diagrammatically in FIG. 4. A web W2 is shown in cross-section. Adjacent the right hand edge, as viewed in FIG. 4, of the web is a nozzle 20 to which air under pressure is applied from a pressure source 21. The nozzle 20 is so positioned that a jet of air is directed towards the edge of the paper from above so that a transverse vibration is set up in the web. The air may be fed continuously from the nozzle 20, or in intermittent pulses, depending on whether one or two sensors respectively are being used.

I claim:

1. Apparatus for measuring tension of a web stretched between supports, comprising means for exciting transverse vibrations in said web, first and second sensors positioned at first and second distances respectively along the web from said exciting means, and means responsive to signals from both said sensors being provided for converting the time interval between the sensing of the vibration in the web, caused by said exciting means, at said first and said second sensors into an indication of the tension of said web.

2. Apparatus as claimed in claim 1 in which said exciting means comprises a moving coil loudspeaker.

3. Apparatus as claimed in claim 1 in which said exciting means comprises a white noise generator.

4. Apparatus as claimed in claim 1 in which said exciting means comprises pneumatic means for directing an airstream against the edge of said web.

5. Apparatus as claimed in claim 1 in which at least one of said sensors comprises a microphone.

6. Apparatus as claimed in claim 1 in which at least one of said sensors comprises a photo-electric device.

* * * * *